(12) United States Patent
Enyeart et al.

(10) Patent No.: US 11,396,229 B2
(45) Date of Patent: Jul. 26, 2022

(54) MULTI-BOSS FLANGE

(71) Applicants: Daniel Ray Enyeart, Gladstone, OR (US); Evan Waymire, Oregon City, OR (US)

(72) Inventors: Daniel Ray Enyeart, Gladstone, OR (US); Evan Waymire, Oregon City, OR (US)

( * ) Notice: Subject to any disclaimer, the term of this patent is extended or adjusted under 35 U.S.C. 154(b) by 175 days.

(21) Appl. No.: 16/924,572

(22) Filed: Jul. 9, 2020

(65) Prior Publication Data
US 2020/0369143 A1 Nov. 26, 2020

Related U.S. Application Data

(63) Continuation of application No. 16/417,143, filed on May 20, 2019, which is a continuation-in-part of application No. 29/626,889, filed on Nov. 21, 2017, now Pat. No. Des. 886,958.

(51) Int. Cl.
*B60K 15/067* (2006.01)
*B60K 15/01* (2006.01)
*B60K 15/00* (2006.01)
*B60K 15/03* (2006.01)

(52) U.S. Cl.
CPC .............. *B60K 15/01* (2013.01); *B60K 15/00* (2013.01); *B60K 15/067* (2013.01); *B60K 15/03* (2013.01)

(58) Field of Classification Search
CPC ...... B60K 15/00; B60K 15/067; B60K 15/03; B60K 15/073
See application file for complete search history.

(56) References Cited

U.S. PATENT DOCUMENTS

| D698,302 S | * | 1/2014 | Waymire | .................... D12/218 |
| 2008/0014390 A1 | * | 1/2008 | Scott | ...................... B29C 51/14 |
| | | | | 428/35.7 |

* cited by examiner

*Primary Examiner* — Stephen J Castellano
(74) *Attorney, Agent, or Firm* — Ingrid McTaggart

(57) ABSTRACT

The present invention relates to a flange that includes a base region, a first raised region, a second raised region, a first sloped region between the base region and the first raised region, and a second sloped region between the base region and the second raised regions, wherein the first and second sloped regions extend through a gap region between the first and second raised regions, and wherein the first and second sloped regions define multiple concave and convex regions in multiple planes of the flange so as to reduce stress within the flange.

17 Claims, 7 Drawing Sheets

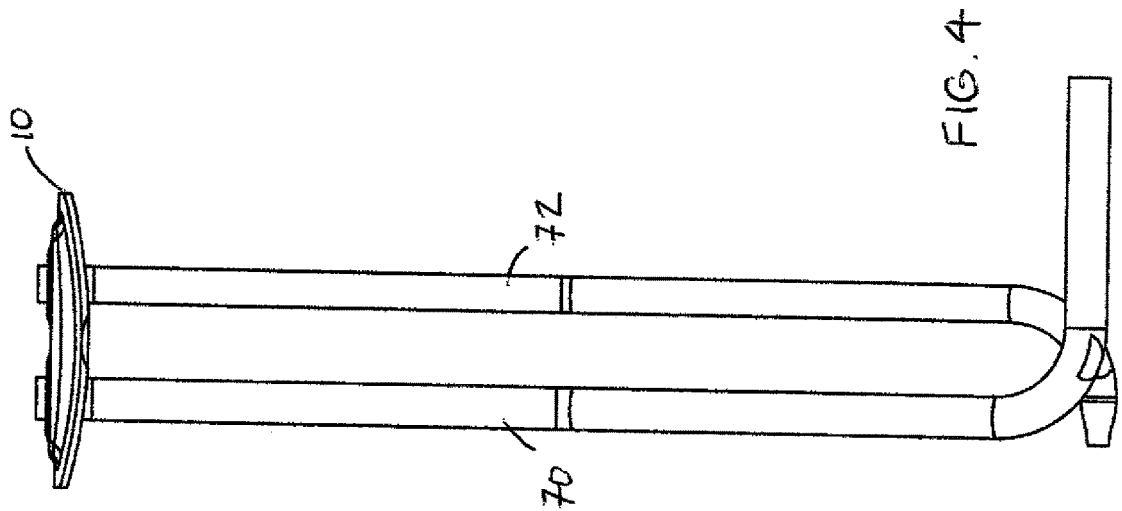
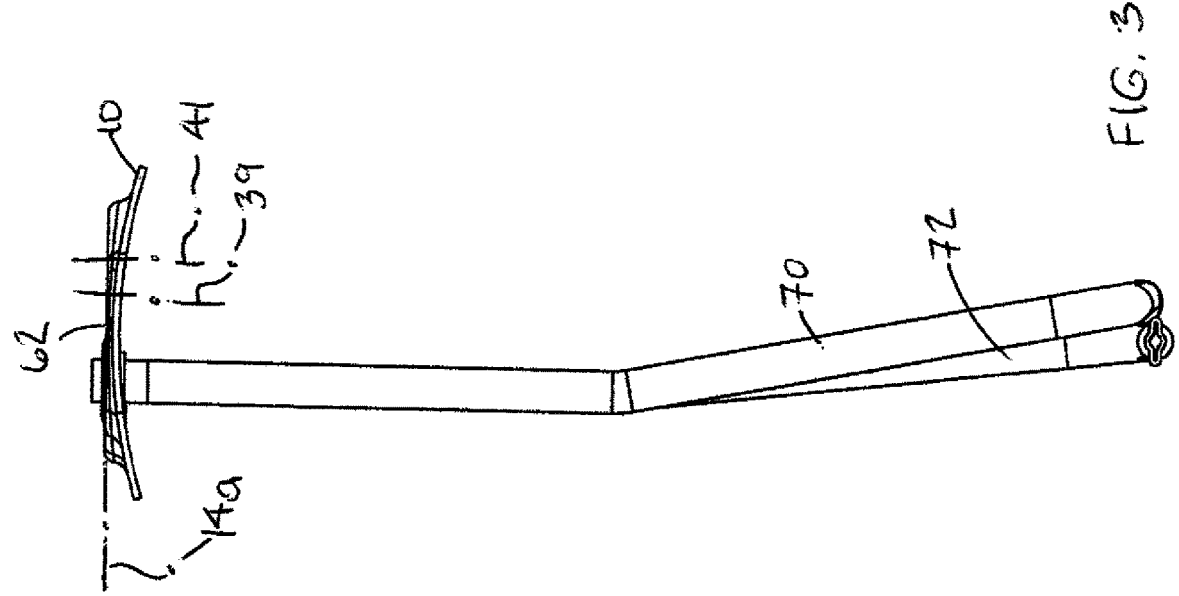

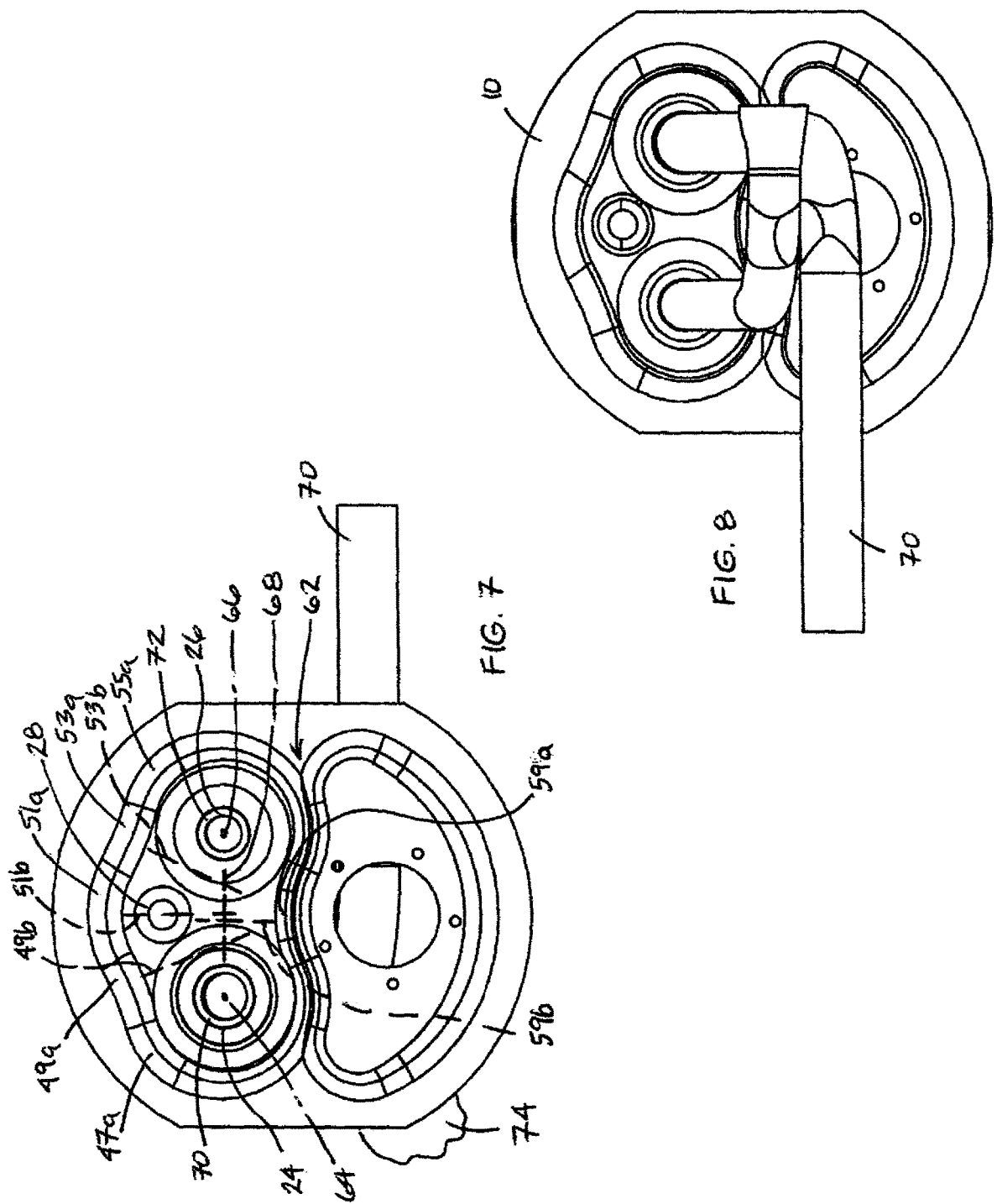

US 11,396,229 B2

MULTI-BOSS FLANGE

This application is a continuation in part of U.S. patent application Ser. No. 16/417,143, filed on May 20, 2019, in the name of inventor Daniel Ray Enyeart, which is a continuation in part of U.S. patent application Ser. No. 29/626,889, filed on Nov. 21, 2017, now U.S. Design Pat. No. D 886,985, in the name of inventor Evan Waymire, and entitled Draw and Return Tube Assembly.

1. TECHNICAL FIELD

The present invention relates to a multi-boss flange for a fuel tank assembly, and a process of manufacturing the same, for use in commercial vehicles, and more particularly, to an anti-fatigue flange for a fuel tank assembly that allows multiple components to be connected to a flange wherein the flange includes contours that reduce stress points within the flange so as to reduce fatigue failures of the flange.

2. BACKGROUND OF THE INVENTION

The present invention is particularly intended for use on commercial vehicles, which may include multiple components secured to or in a fuel tank. Prior art fuel tanks may include multiple components secured to a flat flange wherein the flat flange includes an area within the plane of the flange that is susceptible to a diaphragm effect and fatigue failure of the flange. Accordingly, there is a need to provide a flange which includes multiple components secured thereto, the flange having reduced fatigue failure when compared to prior art flanges.

SUMMARY OF THE INVENTION

The present invention provides a multi-boss flange, and a process of manufacturing the same, that overcomes the disadvantages of the prior art. In particular, the present invention provides a multi-boss flange that includes raised regions and contours which are strategically shaped and arranged to reduce stress within the flange and thereby reduce fatigue failures of the flange of the present invention. One embodiment of the present invention provides a flange that includes: contours around a raised region wherein the contours angle across the direction of highest stress within the flange; contours around a raised region that are positioned so as to shorten blank sections between components secured on the flange; and raised edges positioned around component connection regions. The contours may include alternating concave and convex sections to reduce stress within the flange.

BRIEF DESCRIPTION OF THE DRAWINGS

FIG. 3 is a left side view of the multi-boss flange of FIG. 2.

FIG. 4 is a front view of the multi-boss flange of FIG. 2.

FIG. 7 is a top view of the multi-boss flange of FIG. 2.

FIG. 8 is a bottom view of the multi-boss flange of FIG. 2.

DETAILED DESCRIPTION OF THE PREFERRED EMBODIMENTS

The invention discloses a multi-boss flange that allows multiple components to be secured to the flange, while reducing stress points and fatigue failures of the flange. In particular, the present invention provides a multi-boss flange that includes raised regions and contours which are strategically shaped and arranged to reduce stress within the flange and thereby reduce fatigue failures of the flange during the harsh environmental conditions of highway driving. One embodiment of the present invention provides a flange that includes: contours around a raised region wherein the contours angle across the direction of highest stress within the flange; contours around a raised region that are positioned so as to shorten blank sections between components secured on the flange; raised edges positioned around component connection regions; and two raised regions including a gap region positioned there between wherein a sloped region of each raised region includes contours in the gap region that reduce fatigue failures of the flange. The contours may include alternating concave and convex sections to reduce stress within the flange. The invention will now be described with reference to the drawings.

Figure 1:
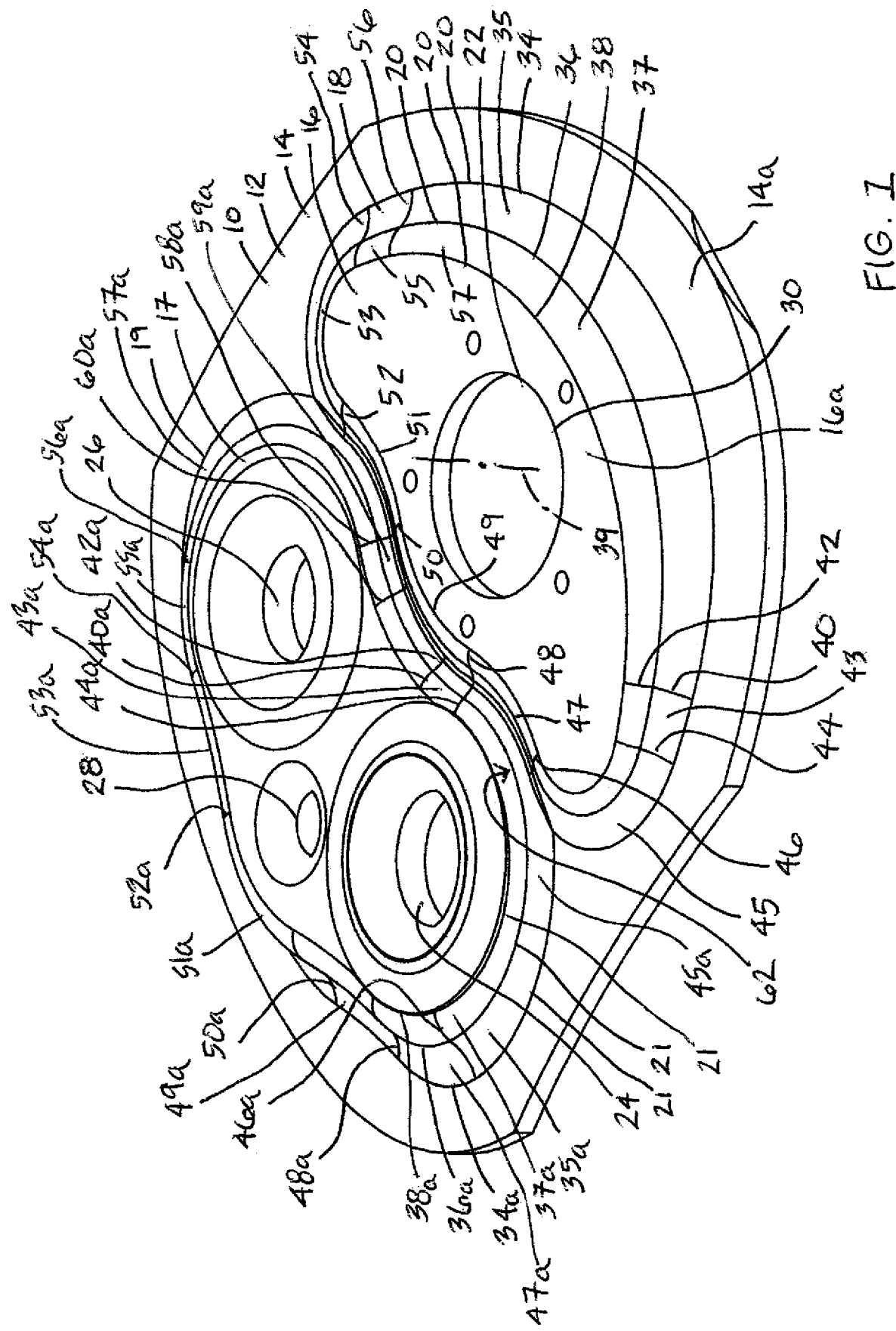
FIG. 1 is an isometric top view of one example embodiment of a multi-boss flange showing only the top flange of the invention.

FIG. 1 is an isometric top view of one example embodiment of a multi-boss flange 10. Flange 10 includes a body 12 having a base region 14, two raised regions 16 and 17, and sloped regions 18 and 19 extending between base region 14 and raised regions 16 and 17, respectively. Sloped region 18 includes contour lines 20 that extend around aperture 22. Sloped region 19 includes contour lines 21 that extend around apertures 24, 26 and 28, wherein contour lines 21 conform in shape to component apertures 24, 26 and 28 positioned on raised region 17. In other words, contour lines 21 curve around component apertures 24, 26 and 28 so that in several places, contour lines 21 closely follow the curved shape or perimeter of component apertures 24, 26 and 28.

Figure 9:
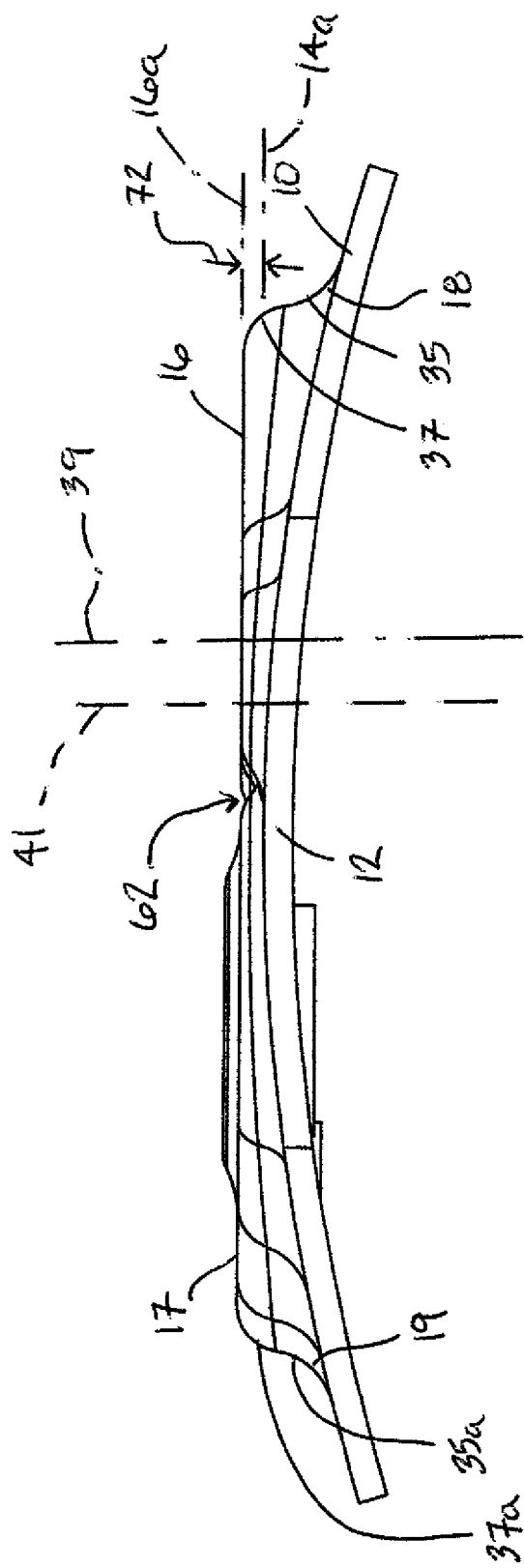
FIG. 9 is a left side view of the flange without tubes secured thereto.

Referring to FIGS. 1 and 9, the component apertures 22, 24, 26 and 28, or any other number of component apertures, on raised regions 16 and or 17 may include a level sender receiving aperture 22 sized to receive a level sender unit 30 therein, a fuel draw aperture 24 sized to receive a fuel draw tube 24a therein, a fuel return aperture 26 sized to receive a fuel return tube 26a therein, and an auxiliary fuel aperture 28 sized to receive an auxiliary fuel tube 28a therein.

Still referring to FIG. 1, sloped region 18 includes contour lines 20 that extend around component aperture 22 positioned on raised region 16. Contour lines 21 conform in shape to and extend around component apertures 24, 26 and 28 positioned on raised region 17. Contour lines 20 and 21 also conform to raised regions 16 and 17 between aperture 22 and apertures 24, 26 and 28. In particular, contour lines 20 may include first contour line 34, second contour line 36 and third contour line 38. First contour line 34 may be positioned on base region 14 and may define the beginning of sloped region 18 that extends upwardly from base region 14 to raised region 16. Second contour line 36 may be defined as approximately half way up, or the mid-point, of the sloped region 18 that extends upwardly from base region 14 to raised region 16. Third contour line 38 may be positioned on raised region 16 and may define the end of sloped region 18 that extends upwardly from base region 14 to raised region 16. The region 35 of sloped region 18 that is positioned between first contour line 34 and second contour line 36 may define a concave region 35 that is curved downwardly toward base region 14, i.e., the shape of the interior of a bowl when viewed from the top of body 12. Region 37 of sloped region 18 that is positioned between second contour line 36 and third contour line 38 may define a convex region 37 that is curved upwardly toward raised region 16, i.e., the shape of the exterior of a bowl when viewed from the top of body 12. Accordingly, second contour line 36 defines an inflection line or transition line between the region 35 of concave curvature of slope 20 downhill of second contour line 36 and the region 37 of convex curvature of slope 20 uphill of second contour line 36 (FIG. 9).

Similarly, second contour lines 21 may include first contour line 34a, second contour line 36a and third contour line 38a. First contour line 34a may be positioned on base region 14 and may define the beginning of sloped region 19 that extends upwardly from base region 14 to raised region 17. Second contour line 36a may be defined as approximately half way up, or the mid-point, of the sloped region 19 that extends upwardly from base region 14 to raised region 17. Third contour line 38a may be positioned on raised region 17 and may define the end of sloped region 19 that extends upwardly from base region 14 to raised region 17. The region 35a of sloped region 19 that is positioned between first contour line 34a and second contour line 36a may define a concave region 35a that is curved downwardly toward base region 14, i.e., the shape of the interior of a bowl when viewed from the top of body 12. Region 37a of sloped region 19 that is positioned between second contour line 36a and third contour line 38a may define a convex region 37a that is curved upwardly toward raised region 17, i.e., the shape of the exterior of a bowl when viewed from the top of body 12. Accordingly, second contour line 36a defines an inflection line or transition line between the region 35a of concave curvature of slope 21 downhill of second contour line 36a and the region 37a of convex curvature of slope 21 uphill of second contour line 36a (FIG. 9).

Body 12 may further define a vertical axis 39 (FIG. 3) and a horizontal plane 14a (FIG. 3) (shown in end view) that is perpendicular to vertical axis 39. Raised region 16 defines a plane 16a that is positioned upwardly along axis 39 from plane 14a of base region 14 such that plane 16a is parallel to horizontal plane 14a and perpendicular to axis 39. In the embodiment shown, plane 16a is positioned a height 72 (FIG. 9) approximately 0.5 inches above plane 14a of base region 14 as measured along axis 39. The concave shape or contour of first slope region 35 and the convex shape or contour of second slope region 37 may be defined as the curvature or contour of the slope of sloped region 18 measured in a plane 41 (shown in end view in FIG. 9) perpendicular to the plane of the top surface of raised region 16 and parallel to axis 39, so that flange 10 may be described as including alternating concave and convex contoured regions positioned in a plane perpendicular to body 12 of flange 10. Similarly, the concave shape or contour of first slope region 35a and the convex shape or contour of second slope region 37a of sloped region 19 may be defined as the curvature or contour of the slope of sloped region 19 measured in a plane 41 perpendicular to a top surface of raised region 17 and parallel to and including vertical axis 39, so that flange 10 may be described as including a second set of alternating concave and convex contoured regions positioned in a plane perpendicular to body 12 of flange 10.

Referring again to FIG. 1, positioned along contour lines 20 are section lines 40 that are positioned generally perpendicular to contour lines 20 and that mark a change in contour or curvature, i.e., an inflection line or transition line, of contour lines 20 with respect to component aperture 22 positioned on raised region 16. In particular, section lines 40 mark the transition of contour lines 20, i.e., the set of contour lines 34, 36 and 38, from a concave curvature to a convex curvature, and vice verse, with respect to component aperture 22 positioned on raised region 16.

Section lines 40 may include individual section lines, also referred to as lines of inflection, 42, 44, 46, 48, 50, 52, 54, and 56. Section lines 44 and 46 define a concave section 45 there between, such that contour lines 34, 36 and 38 between section lines 44 and 46 are positioned concave toward component aperture 22, meaning that contour lines 34, 36 and 38 each define a curve that generally curves away from the perimeter of aperture 22. In other words, contour lines 34, 36 and 38 between section lines 44 and 46 each define a curve similar to the interior shape of a bowl in section 45 with respect to aperture 22. Section lines 46 and 48 define a convex section 47 there between, such that contour lines 34, 36 and 38 between section lines 46 and 48 are positioned convex away from aperture 22. In other words, contour lines 34, 36 and 38 each define a curve similar to the exterior shape of a bowl in section 47 with respect to aperture 22. Section lines 48 and 50 define a concave section 49 there between, such that contour lines 34, 36 and 38 between section lines 48 and 50 are concave inwardly toward aperture 22. Section lines 50 and 52 define a convex section 51 there between, such that contour lines 34, 36 and 38 between section lines 50 and 52 are convex outwardly away from aperture 22. Similarly, sections 53 and 57 are each concave sections that are concave inwardly toward the closest component aperture 22. Sections 55 and 43 are each convex sections that are convex outwardly away from the closest component aperture 22.

Similarly, second raised region 17 includes section lines 40a which may include individual section lines, also referred to as lines of inflection, 42a, 44a, 46a, 48a, 50a, 52a, 54a, and 56a, 58a and 60a. Section lines 44a and 46a define a concave section 45a there between, such that contour lines 34a, 36a and 38a between section lines 44a and 46a are positioned concave toward component aperture 24, meaning that contour lines 34a, 36a and 38a each define a curve that generally curves away from the perimeter of aperture 24. In other words, contour lines 34a, 36a and 38a each define a curve similar to the interior shape of a bowl in section 45a with respect to aperture 24. Section lines 48a and 50a define a convex section 49a there between, such that contour lines 34a, 36a and 38a between section lines 48a and 50a are positioned convex away from aperture 24. In other words, contour lines 34a, 36a and 38a each define a curve similar to the exterior shape of a bowl in section 49a with respect to aperture 24. Section lines 50a and 52a define a concave section 51a there between, such that contour lines 34a, 36a and 38a between section lines 50a and 52a are concave inwardly toward aperture 28. Section lines 52a and 54a define a convex section 53a there between, such that contour lines 34a, 36a and 38a between section lines 52a and 54a are convex outwardly away from aperture 28. Similarly, section 57a is a concave section that is concave inwardly toward the closest component aperture 26. Sections 59a and 43a are each convex sections that are convex outwardly away from the closest component apertures 26 and 24, respectively.

The concave or convex shape or contour of sections between sections lines, such as section 43 between sections lines 42 and 44, and section 45 between section lines 44 and 46, may be defined as the curvature or contour of the slope of sloped regions 18 and 19 measured in plane 14a parallel to raised regions 16 and 17, so that flange 10 may be described as including alternating concave and convex contoured regions positioned in a plane 14a parallel to body 12 of flange 10, and perpendicular to axis 39.

Accordingly, this alternating pattern of convex and concave sections between adjacent section lines 40 continues around raised regions 16 and 17 with each section between adjacent section lines alternating between being positioned concave toward its corresponding raised region 16 or 17 and being positioned convex toward its corresponding raised region 16 or 17. Simultaneously, sloped regions 18 and 19 each include a convex region 37 or 37a uphill of contour line 36 or 36a and a concave region 35 or 35a downhill of contour line 36 or 36a, respectively, as sloped regions 18 and 19 extend around raised regions 16 and 17, respectively. This arrangement of concave and convex contours parallel to the plane of raised regions 16 or 17, and concave and convex contours perpendicular to the plane of raised regions 16 or 17, respectively, provides for reduced stress and reduced fatigue failures of flange 10 when in use.

Moreover, in addition to the the alternating arrangement of concave and convex regions around each raised region, the two raised regions them selves are separated by a gap region 62. Gap region 62 itself is believed to reduce fatigue failure of flange 10 but adding stiffness to the flange. Moreover, gap 62 includes sloped regions 18 and 19, which includes contoured regions on sloped regions 18 and 19 that alternate with one another. In particular, raised region 16 includes concave contoured region 49 that is positioned adjacent convex contoured region 43a of raised region 17. Similarly, raised region 16 includes convex contoured region 47 that is positioned adjacent concave contoured region 45a of raised region 17. In other words, raised regions 16 and 17 each include alternating concave and convex regions on their sloped regions, wherein the concave and convex regions of each sloped region alternates with the concave and convex regions of the opposing sloped region.

Accordingly, raised region 16 includes alternating concave and convex sections 35 and 37 measured down the sloped region 18 of raised region 16 toward base plate 14, alternating concave and convex sections 45, 47, 49 and 51, for example, measured around the edge of raised region 16, and alternating concave and convex regions 47, 49 and 51 which alternate with the alternating concave and convex regions 45a, 43a, 59a and 57a of the opposing sloped region 19 of raised region 17 in gap region 62. These multiple types of alternating concave and convex surfaces, in multiple planes, and extending through gap region 62 between the component apertures, provides an enhanced stiffness and resistance to fatigue failure over prior art devices which do not include such alternating surface features or sloped regions that extend between component apertures.

The description of the stress reduction provided by these alternating concave and convex sections in planes parallel to and perpendicular to body 12, and in gap region 62, of flange 10 will now be described.

Referring to FIG. 7, fuel draw aperture 24 defines a fuel draw axis 64 (shown in end view) and fuel return aperture 26 defines a fuel return axis 66 (shown in end view). A fuel draw tube 70 may be secured within the fuel draw aperture 24 and a fuel return tube 72 may be secured within the fuel return aperture 26, wherein the tubes may be elongate tubes that extend downwardly into a fuel tank 74 (a portion shown for ease of illustration) on which the flange is mounted. During typical highway driving conditions, movement of the vehicle may cause the fuel within the tank to oscillate and vibrate which may cause a resonancy effect that causes stress and fatigue of the fuel tank and the flange 10 mounted thereon. A stress line 68 may be defined as extending from axis 64 to axis 66 as a result of stresses imparted to the draw and return tubes 70 and 72 from the fuel within the fuel tank. In prior art flat flanges that do not include a sloped region 18 between component apertures 22 and base region 14, this stress line 68 may define the region of highest stress within the prior art flanges. Accordingly, during periods of high stress and fatigue, prior art flanges may undergo a diaphragm effect, or a folding effect, at stress line 68 such that the prior art flanges may fold along the line connecting the fuel draw aperture 24 and the fuel return aperture 26.

Applicants have provided the present design so as to reduce the diaphragm effect at stress line 68 so that the flange 10 of the present invention has a reduced tendency to fold along stress line 68. Applicant's design has at least four distinct features that provide such enhanced stress reduction.

First, Applicant's design provides a plurality of component apertures 22 on multiple raised regions 16 and 17 so that sloped regions 18 and 19 provide a bi-level flange that reduces the tendency of flange 10 to fold at line 68.

Second, Applicants design provides sloped regions 18 and 19 with a lower concave region 35 and an upper convex region 37 that further reduces the tendency of flange 10 to fold at line 68. In other words, Applicants design provides alternating concave and convex regions in a plane 41 perpendicular to plane 14a of the base region 14 to reduce the tendency of flange 10 to fold at line 68, i.e., the upper sloped region 37 is curved outwardly and the lower curved region is sloped inwardly toward the raised region 18.

Third, Applicants design provides alternating concave and convex regions in a plane 14a parallel to base region 14, such as sections 43, 45, 47, 49, 51, 53, 55, and 57 on sloped region 18 (and similar alternating sections 43a, 45a, 47a, etc. on sloped region 19) to reduce the tendency of flange 10 to fold at line 68. In particular, convex sections 49a, 51a, and 53a each define a tangent line 49b, 51b and 53b, that each intersect line 68 and that each extend between adjacent component apertures 22, such that stress induced along line 68 will be transferred in part to each of tangent lines 49b, 51b and 53b, thereby diffusing and reducing the stress experienced by flange 10 at line 68. In particular, line 49b that is perpendicular to a tangent line of section 49a extends between fuel draw aperture 24 and fuel auxiliary aperture 28 and intersects stress line 68. Line 51b that is perpendicular to a tangent line of section 51a extends between fuel return aperture 26 and fuel draw aperture 24 and intersects stress line 68. A line 53b that is perpendicular to a tangent line of section 53a extends between fuel return aperture 26 and fuel auxiliary aperture 28 and intersects stress line 68. A line 59b that is perpendicular to a tangent line of section 59a extends between fuel return aperture 26 and fuel draw aperture 24 and intersects stress line 68. Applicants believe that these tangent lines that intersect stress line 68 reduce the stress and resultant fatigue failures of the flange 10 of the present invention by at least five percent, compared with prior art flanges that do not includes such stress reducing tangent lines therein.

Fourth, Applicant's design provides two sloped regions 18 and 19 that each extend between raised regions 16 and 17, with a convex sloped region of one sloped region being positioned adjacent a concave sloped region of the other sloped region so that concave and convex regions of one slope alternate within a single slope, and also alternate with respect to the adjacent slope of the other raised region.

All of these different types of contours help to alleviate stress within flange 10 and reduce fatigue failures of flange 10.

Figure 2:
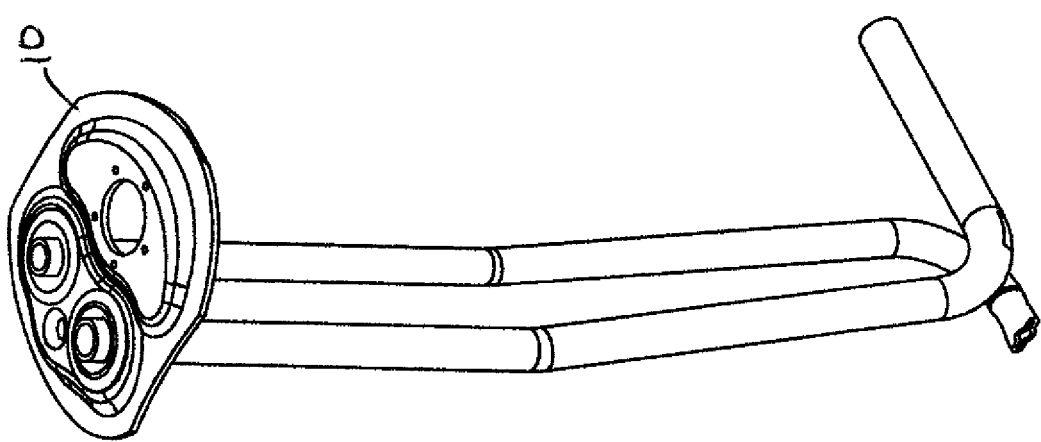
FIG. 2 is an isometric view of the multi-boss flange including draw and return tubes secured thereto.

FIG. 2 is an isometric view of the multi-boss flange 10 of the present invention.

FIG. 3 is a left side view of the multi-boss flange 10 of FIG. 2. Flange 10 is shown including sloped region 18 having concave sloped region 35 and convex sloped region 37 positioned in a plane 41 parallel to and including vertical axis 39.

FIG. 4 is a front view of the flange of FIG. 2.

Figure 5:
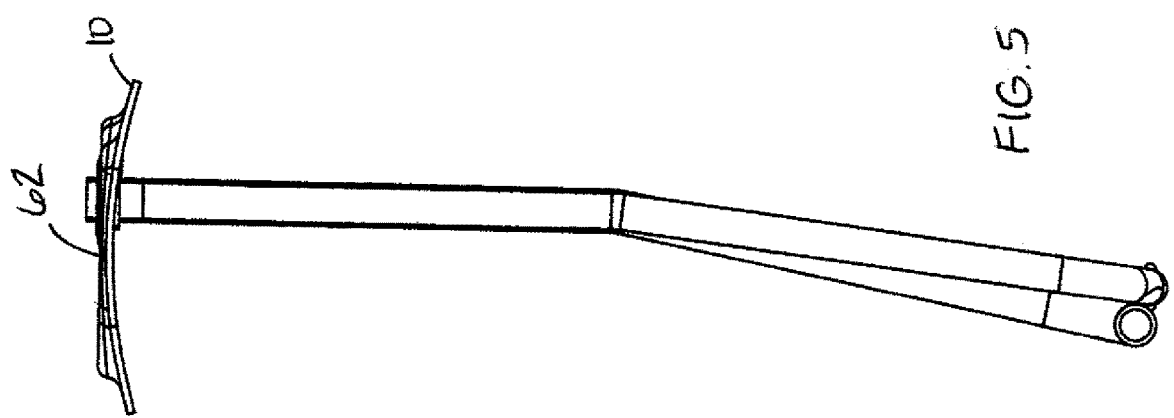
FIG. 5 is a right side view of the multi-boss flange of FIG. 2.

FIG. 5 is a right side view of the flange of FIG. 2.

Figure 6:
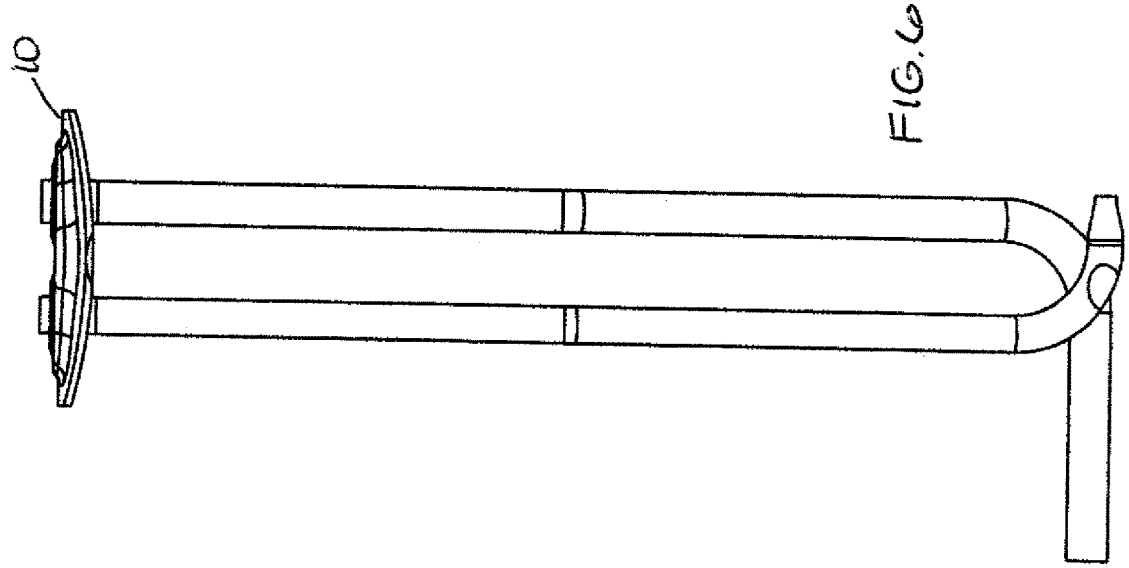
FIG. 6 is a rear view of the multi-boss flange of FIG. 2.

FIG. 6 is rear view of the flange of FIG. 2.

FIG. 7 is a top view of the flange of FIG. 2.

FIG. 8 is a bottom view of the flange of FIG. 2.

FIG. 9 is an isometric view of the flange of FIG. 2.

Figure 10:
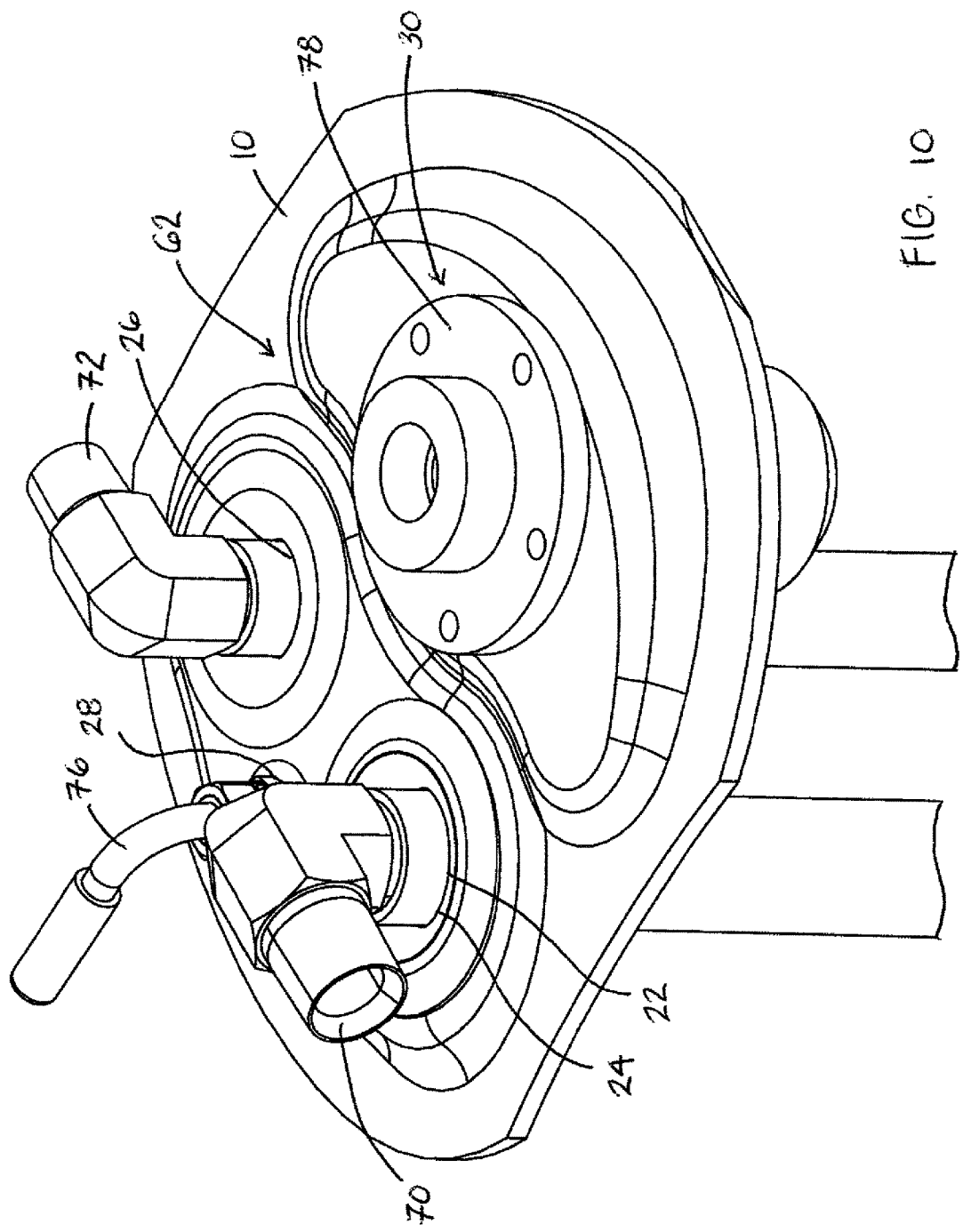
FIG. 10 is an isometric view of the multi-boss flange including draw and return tubes secured thereto.

FIG. 10 is a detailed isometric view showing the contour lines of the sloped region of the flange of the present invention and showing components secured within the component apertures of the flange. The component apertures 22 on raised region 17 may include a fuel draw aperture 24 sized to receive a fuel draw tube 70 therein, a fuel return aperture 26 sized to receive a fuel return tube 72 therein, an auxiliary fuel aperture 28 sized to receive an auxiliary fuel tube 76 therein, and raised region 16 may include a level sender receiving aperture 30 sized to receive a level sender unit 78 therein.

The present invention provides a flange having a base region, two raised regions and a sloped region positioned between each of the raised regions and the base region. The sloped regions define convex and concave contours, such as the curvatures of contour lines 34, 36 and 38 that are positioned in a horizontal plane 14*a* that is parallel to the plane of the top surface of raised region 16, and perpendicular to a plane 41 that includes vertical axis 39. The sloped regions also define convex and concave contours, such as the curvatures of regions of slope 35 and 37 that are positioned in a horizontal plane 41 that is perpendicular to the plane 14*a* of the top surface of raised region 16, and parallel to vertical axis 39. The sloped regions further define convex and concave regions that alternate with one another in a location between the two raised regions.

As may be understood from the above description and drawings, the present invention has many advantages over prior art fuel tank flanges. In the above description numerous details have been set forth in order to provide a more thorough understanding of the present invention. It will be obvious, however, to one skilled in the art that the present invention may be practiced using other equivalent designs.

We claim:

1. A fuel tank flange, comprising:
a flange body including a base region;
a first raised region;
a second raised region;
a first sloped region extending between said base region and said first raised region wherein said first raised region is positioned vertically upwardly from said base region as measured along a vertical axis of said flange body;
a second sloped region extending between said base region and said second raised region wherein said second raised region is positioned vertically upwardly from said base region as measured along a vertical axis of said flange body;
a first component aperture positioned in said first raised region;
a second component aperture positioned in said second raised region; and
wherein said first sloped region defines a plurality of alternating convex curved regions and concave curved regions positioned completely around said first raised region, and wherein said second sloped region defines a plurality of alternating convex curved regions and concave curved regions positioned completely around said second raised region.

2. The flange of claim 1 wherein said first sloped region plurality of alternating concave and convex curved regions is positioned in a plane perpendicular to said vertical axis of said flange and wherein said second sloped region plurality of alternating concave and convex curved regions is positioned in a plane perpendicular to said vertical axis of said flange.

3. The flange of claim 2 wherein individual ones of said plurality of convex curved regions are each positioned between individual ones of said plurality of concave curved regions such that said first sloped region defines an alternating pattern of concave and convex curved regions positioned in said plane perpendicular to said vertical axis.

4. The flange of claim 1 wherein said first and second raised regions define a gap region there between, wherein a convex region of said first sloped region is positioned adjacent a concave region of said second sloped region in said gap region, and wherein a concave region of said first slope is positioned adjacent a convex region of said second slope in said gap region.

5. The flange of claim 4 further comprising a third component aperture positioned in said second raised region, wherein a stress line extends between said second and third component apertures, and wherein a convex curved region of said second slope in said gap region curves inwardly towards said stress line.

6. The flange of claim 5 further including a fuel draw tube secured within said second component aperture, a fuel return tube secured within said third component aperture, a fuel auxiliary tube secured within a fourth component aperture in said second raised region, and a level sender assembly secured within said first component aperture in said first raised region.

7. The flange of claim 4 wherein a concave curved region of said first slope in said gap region curves outwardly away from said first aperture.

8. The flange of claim 1 wherein said first raised region defines a first contour line, a second contour line, and a third contour line, said first and second contour lines of said first raised region defining a convex contoured section there between, said second and third contour lines defining a concave contoured section there between such that said second contour line is a line of inflection between said concave contoured section and said convex contoured section.

9. The flange of claim 8 wherein said concave contoured section defines a concave contour and said convex contoured section defines a convex contour, said concave contour and said convex contour both positioned in a plane parallel to and including said vertical axis of said flange.

10. The flange of claim 1 wherein said second raised region defines a first contour line, a second contour line, and a third contour line, said first and second contour lines of said second raised region defining a convex contoured section there between, said second and third contour lines defining a concave contoured section there between such that said second contour line is a line of inflection between said concave contoured section and said convex contoured section.

11. The flange of claim 10 wherein said concave contoured section defines a concave contour and said convex contoured section defines a convex contour, said concave contour and said convex contour both positioned in a plane parallel to and including said vertical axis of said flange.

12. A fuel tank flange assembly, comprising:
a flange body including a base region, a first raised region extending upwardly from said base region, a second raised region extending upwardly from said base region, a gap region position between said first raised region and said second raised region, a first sloped region position between said base region and said first raised region in said gap region, a second sloped region position between said base region and said second raised region in said gap region, said first sloped region including a curved region that is concave with respect to said first raised region, said second sloped region including a curved region that is convex with respect to said second raised region, and wherein said concave curved region of said first sloped region is positioned adjacent said convex curved region of said second sloped region in said gap region; and
wherein said first sloped region defines a plurality of alternating convex curved regions and concave curved regions positioned completely around said first raised region, and wherein said second sloped region defines a plurality of alternating convex curved regions and concave curved regions positioned completely around said second raised region.

13. The flange of claim 12 wherein said first sloped region includes a lower region adjacent said base region that curves downwardly toward said base region, said first sloped region includes an upper region adjacent said first raised region that curves upwardly away from said base region; said second sloped region includes a lower region adjacent said base region that curves downwardly toward said base region, and said second sloped region includes an upper region adjacent said second raised region that curves upwardly away from said base region.

14. The flange of claim 12 wherein said first raised region includes two apertures therein, and wherein a line that is perpendicular to a tangent line of said concave curved region in said gap region extends between said two apertures.

15. The flange of claim 12 wherein said second raised region includes an aperture therein, and wherein said convex curved region in said gap region defines a curve that follows a curvature of said aperture.

16. The flange of claim 12 wherein said first sloped region defines a first contour line, a second contour line, and a third contour line, said first and second contour lines defining a first convex contoured section there between, said second and third contour lines defining a first concave contour section there between such that said second contour line is a line of inflection between said first concave contoured section and a first convex contoured section, and wherein said second sloped region defines a fourth contour line, a fifth contour line, and a sixth contour line, said fourth and fifth contour lines defining a second convex contoured section there between, said fifth and sixth contour lines defining a second concave contoured section there between such that said fifth contour line is a line of inflection between said second concave contoured section and said second convex contoured section.

17. A flange assembly, comprising:
a flange body including a base region that defines a top surface, a first raised region positioned upwardly from said top surface of said base region, a second raised region positioned upwardly from said top surface of said base region, a gap region position between said first and said second raised regions, a first sloped region extending between said base region and said first raised region in said gap region, and a second sloped region extending between said base region and said second raised region in said gap region;
wherein said first sloped region in said gap region defines an upper sloped region that is concave with respect to said top surface of said base region and a lower sloped region that is convex with respect to said top surface of said base region;
wherein said second sloped region in said gap region defines an upper sloped region that is concave with respect to said top surface of said base region and a lower sloped region that is convex with respect to said top surface of said base region;
a flange axis positioned perpendicular to said top surface of said base region, wherein said first sloped region defines three inflection lines positioned within said gap region, said three inflection lines of said first sloped region defining a change in curvature of said first sloped region with respect to said flange axis, and wherein said second sloped region defines three inflection lines positioned within said gap region, said three inflection lines of said second sloped region defining a change in curvature of said second sloped region with respect to said flange axis; and
wherein said first sloped region includes an alternating pattern of concave and convex curvatures extending completely around said first raised region, wherein said concave and convex curvatures of said first sloped region are measured with respect to said flange axis, and said second sloped region includes an alternating pattern of concave and convex curvatures extending completely around said second raised region, wherein said concave and convex curvatures of said second sloped region are measured with respect to said flange axis.

* * * * *